Figure 1:
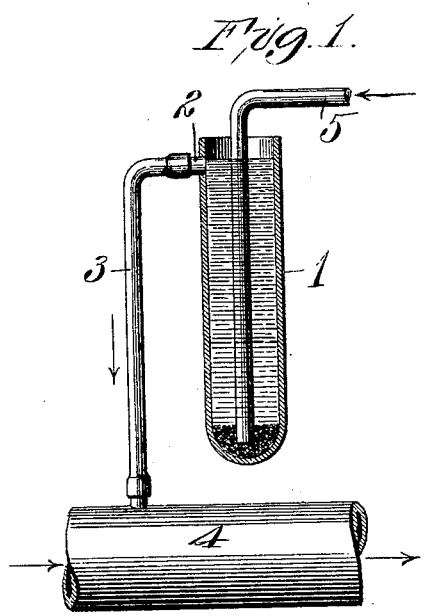

No. 806,945. PATENTED DEC. 12, 1905.
J. F. WIXFORD.
PROCESS OF PREPARING AND FEEDING REAGENTS.
APPLICATION FILED APR. 28, 1905.

Witnesses:
Wm. H. Scott
Fred F. Reisner

Inventor:
John F. Wixford
by Carr & Carr
Attys.

UNITED STATES PATENT OFFICE.

JOHN F. WIXFORD, OF ST. LOUIS, MISSOURI.

PROCESS OF PREPARING AND FEEDING REAGENTS.

No. 806,945.  Specification of Letters Patent.  Patented Dec. 12, 1905.

Application filed April 28, 1905. Serial No. 257,850.

*To all whom it may concern:*

Be it known that I, JOHN F. WIXFORD, a citizen of the United States, and a resident of the city of St. Louis and State of Missouri, have invented a new and useful Process of Preparing and Feeding Reagents, of which the following is a specification.

My invention relates to processes of preparing and feeding reagents which are commercially obtainable in solid form.

It has for its principal object to continuously make a liquid preparation, either a solution or a mixture or a combination of solution and mixture, of the reagents used and continuously introduce it into the matter to be treated, and hence to avoid the preparation and storage of large quantities of reagents in advance of their use.

My invention consists principally in passing a stream of the liquid, serving as a solvent or a menstruum, through a mass of the solid reagent and into the matter to be treated, the mass of the reagent being replenished at regular measured intervals with uniform charges, each equal in amount to the amount of solid reagent going into solution or suspension or both into solution or suspension during the interval between the charges.

It also consists in the preparations of mixtures or solutions of reagents supplied in solid form by passing a stream of the menstruum or solvent through a mass of the solid reagent, which is replenished at regular measured intervals with uniform charges, each equal in amount to the amount of the solid reagent going into suspension or solution during the interval between charges.

Heretofore in industrial processes wherein chemical reagents are employed it has been common to make liquid preparations thereof in large quantities for which special storage-tanks were required. Considerable care is required in order to determine the strength of such solutions and to feed the proper amount for the matter to be treated. In my process no storage-tank is required. The liquid preparation of the reagent is made continuously, so as to produce a stream of the requisite strength, which is introduced directly into the matter to be treated. The strength of the liquid preparation is subject to control and can be kept practically constant for any desired length of time.

The process is especially applicable to water-purification systems in which large quantities of reagents—such as alum, ferrous sulfate, lime, and the like—are used. In carrying out water-purification processes it is desired to add to the water definite quantities of the reagents at a uniform rate, so that every portion of the stream of water to be treated shall receive just the proper amount. A continuous stream of the liquid preparation of the reagents is introduced into the stream of water to be treated as it passes to the settling-basins.

Figure 2:
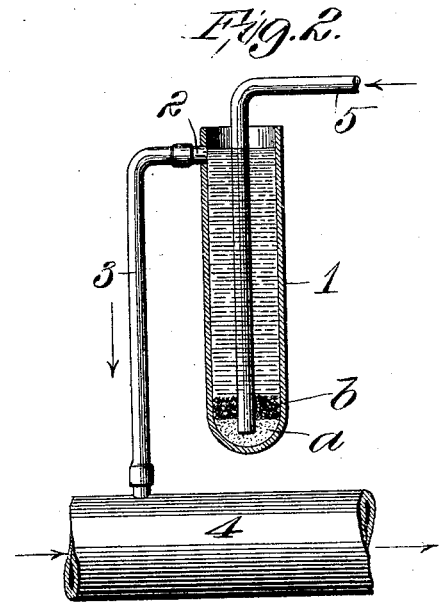
Figure 3:
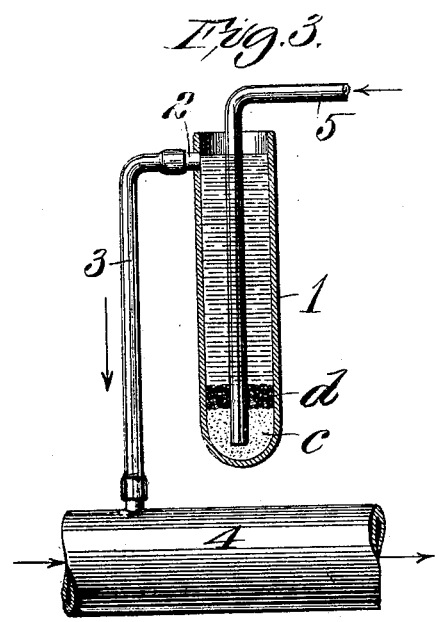
Figure 4:
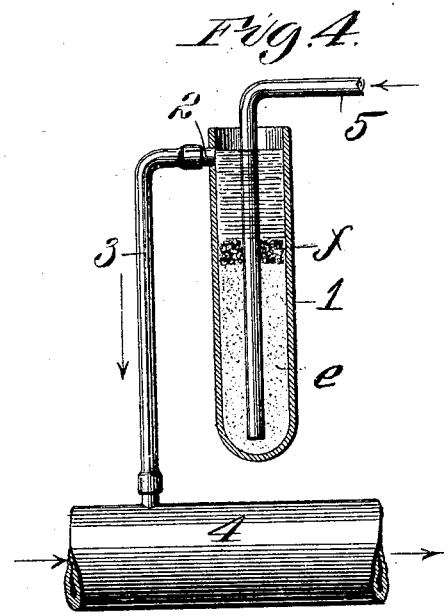

The mode of operation to prepare a solution of ferrous sulfate, for example, is illustrated in Figs. 1 to 4. A vessel 1 is provided with an overflow-spout 2 near the top. A tube or pipe 3 connects with the spout and leads to the vessel or conduit 4, into which the solution of ferrous sulfate is to be introduced. A pipe 5, carrying water, extends nearly to the bottom of the vessel 1. Thus the water will flow upwardly through the mass of sulfate, which insures action upon the entire mass of the sulfate. The water is supplied in a continuous stream, and hence a continuous stream of the solution will issue from the overflow-spout 2. A charge of the ferrous sulfate in solid form, either anhydrous or crystalline, is put in the vessel at the beginning of an interval of time. The quantity of this charge is equal to the amount which is intended to be dissolved in the given interval. Fig. 1 illustrates the condition at the beginning of the first interval. During the first interval not all of the ferrous sulfate will be dissolved. At its end a residuum will still remain in the vessel, and a second charge of the same size as the first is introduced. The condition at the beginning of the second interval is illustrated in Fig. 2, showing a vessel containing a residuum $a$ and a new charge $b$. During the second interval a larger mass of the sulfate is present and a larger surface is exposed to the action of the water. Hence a larger quantity of the sulfate will be dissolved, but not a quantity equal to the charge. Consequently at the end of the interval there will be a larger residuum than at the end of the first interval. A third charge being added the condition at the beginning of the third interval will be illustrated by Fig. 3, showing a vessel containing a residuum $c$ and a new charge $d$. The addition of a new charge at the end of each interval of time being continued a mass of the ferrous sulfate will finally accumulate, which will expose such a large surface to the action of the water that a quantity equal to the charge will be dissolved during each interval. Thereafter the residuum at the end of the intervals will be constant. This practically constant condition is illustrated in Fig. 4, showing a vessel containing the residuum $e$ remaining at the end of each interval and a new charge $f$. By varying the size of the charges, by varying the interval between the charges, or by varying the volume of the water passing through the mass of the solid ferrous sulfate the strength of the resulting solution may be varied. If the size of the charge is increased without a corresponding increase of the interval between charges and the volume of water, a larger mass of the sulfate will accumulate in the vessel or tank, and a stronger solution will result. By decreasing the charge the opposite result, a more dilute solution, will be secured. If the interval between charges is decreased without a corresponding decrease of the charge or increase of the volume of water flowing per unit of time, a larger mass of the sulfate will accumulate and a stronger solution will be secured. On the other hand, an increase in the interval will result in a more dilute solution. If the volume of water flowing per unit of time is decreased without a corresponding decrease of the charge or increase of the interval between the charges, a stronger solution will flow from the vessel. The amount of reagent going into solution per unit of time will not be changed, however. A more dilute solution can be secured by increasing the volume of water flowing per unit of time under the same circumstances. So long as the charges, the intervals between charges, and the volumes of water per unit of time are kept constant the resulting solution will remain practically constant. To secure the most satisfactory results, the volume of the stream of water, the interval between the charges of the sulfate, and the size of the charges will be so determined that the mass of solid ferrous sulfate accumulated in the vessel will be large in comparison with the size of the charges.

While the process has been disclosed as applied to the preparation and feeding of ferrous sulfate, it is obvious that it can be applied to any soluble reagent and that whether there is a chemical reaction between the liquid and the solid reagent or not.

The process is equally applicable to the preparation and feeding of reagents which are only slightly or not at all soluble and are put into liquid form by suspending particles thereof in a menstruum, as a mixture, for example. If the current of the menstruum does not sufficiently agitate the reagent in solid form to cause the formation of the mixture, the agitation may be increased by any suitable method.

Obviously my process is applicable to the preparation and feeding of soluble reagents other than those mentioned in the foregoing specification, and therefore I do not wish to be limited to the specific reagents, solvents, or menstruums mentioned. It is also obvious that the liquid preparation of the reagent may be directed to any suitable receptacle when the resulting preparation is not required for immediate use, and I do not wish to be restricted to immediate use of such liquid preparation.

What I claim as my invention, and desire to secure by Letters Patent, is—

1. The process of preparing and feeding reagents which consists in passing a stream of liquid through a mass of a reagent in solid form and into the matter to be treated, and in adding uniform measured charges of the reagent to said mass at regular measured intervals.

2. The process of preparing and feeding reagents which consists in passing a stream of liquid through a mass of a reagent in solid form and into the matter to be treated and in adding to said mass at regular measured intervals charges of the reagent in solid form each equivalent in amount to the amount of the reagent carried away by the liquid during each interval.

3. The process of preparing and feeding reagents which consists in passing a stream of liquid upwardly through a mass of a reagent in solid form and into the matter to be treated and in adding measured charges of the reagent to said mass at measured intervals.

4. The process of preparing and feeding soluble reagents which consists in passing a stream of a solvent through a mass of a reagent in solid form and into the matter to be treated, and in adding uniform measured charges of the reagent to said mass at regular measured intervals.

5. The process of preparing and feeding soluble reagents which consists in passing a stream of a solvent through a mass of a soluble reagent in solid form and into the matter to be treated, and in adding to said mass at regular measured intervals uniform measured charges of the reagent each equal in amount to the amount of the reagent going into solution during each interval.

6. The process of preparing and feeding soluble reagents which consists in passing a stream of a solvent upwardly through a mass of a reagent in solid form and into the matter to be treated, and in adding measured charges of the reagent to said mass at measured intervals.

7. The process of preparing and feeding ferrous sulfate which consists in passing a stream of water through a mass of ferrous sulfate in solid form and into the matter to be treated, and in adding equal measured charges of ferrous sulfate to said mass at equal measured intervals.

8. The process of preparing and feeding ferrous sulfate which consists in passing a stream of water through a mass of ferrous sulfate in solid form and into the matter to be treated, and in adding to said mass at regular measured intervals uniform charges of ferrous sulfate equal in amount to the amount of ferrous sulfate dissolved during each interval.

9. The process of preparing and feeding ferrous sulfate which consists in passing a stream of water upwardly through a mass of ferrous sulfate in solid form and into the matter to be treated and in adding measured charges of ferrous sulfate to said mass at measured intervals.

10. The process of making liquid preparations from solid reagents which consists in passing a stream of liquid through a mass of a reagent in solid form and in adding measured charges of the reagent in solid form to said mass at measured intervals.

11. The process of preparing solutions of constant strength which consists in passing a stream of liquid through a mass of a reagent in solid form and in adding to said mass at equal intervals equal charges of the reagent each equal in amount to the amount dissolved during each interval.

12. The process of preparing constant solutions of ferrous sulfate which consists in passing a stream of water through a mass of the ferrous sulfate in solid form and in adding to said mass at regular measured intervals charges of ferrous sulfate equal in amount to the amount dissolved during each interval.

13. The process of making liquid preparations from solid reagents which consists in passing a liquid upwardly through a mass of reagent in solid form and in adding measured charges of the reagent to said mass at measured intervals.

14. The process of making liquid preparations from solid reagents which consists in passing a liquid through a mass of a reagent in solid form and in adding measured charges of the reagent to said mass at measured intervals, each of said charges being small in comparison with said mass.

In testimony whereof I have signed my name to this specification, in the presence of two subscribing witnesses, this 26th day of April, 1905.

JOHN F. WIXFORD.

Witnesses:
FRED. F. REISNER,
JULIA B. MEGOWN.